US012774964B2

(12) United States Patent
Hishitani

(10) Patent No.: US 12,774,964 B2
(45) Date of Patent: Oct. 27, 2026

(54) IMAGING DEVICE, INSPECTION DEVICE, INSPECTION METHOD AND SUBSTRATE PROCESSING APPARATUS

(71) Applicant: SCREEN HOLDINGS CO., LTD., Kyoto (JP)

(72) Inventor: Daisuke Hishitani, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 169 days.

(21) Appl. No.: 18/194,905

(22) Filed: Apr. 3, 2023

(65) Prior Publication Data

US 2023/0314343 A1 Oct. 5, 2023

(30) Foreign Application Priority Data

Apr. 5, 2022 (JP) ................................ 2022-062763

(51) Int. Cl.
*G01N 21/95* (2006.01)
*G01N 21/88* (2006.01)

(52) U.S. Cl.
CPC ..... *G01N 21/9503* (2013.01); *G01N 21/8806* (2013.01); *G01N 21/8851* (2013.01); *G01N 2021/8819* (2013.01)

(58) Field of Classification Search
CPC ...................................................... H01L 22/12
See application file for complete search history.

(56) References Cited

U.S. PATENT DOCUMENTS

| | | | | |
|---|---|---|---|---|
| 2017/0153550 | A1* | 6/2017 | Kim | G03F 7/16 |
| 2017/0244936 | A1* | 8/2017 | Koga | G01N 21/8806 |
| 2019/0242830 | A1 | 8/2019 | Kato et al. | |
| 2019/0252213 | A1* | 8/2019 | Koizumi | C25D 17/001 |

FOREIGN PATENT DOCUMENTS

| | | | | |
|---|---|---|---|---|
| JP | 2007-010640 | A | | 1/2007 |
| JP | 2007155448 | A | * | 6/2007 |
| JP | 2009-025003 | A | | 2/2009 |
| JP | 5634722 | B2 | | 12/2014 |
| JP | 2016-178298 | A | | 10/2016 |
| JP | 2017-139492 | A | | 8/2017 |
| JP | 2017-152443 | A | | 8/2017 |
| JP | 6617050 | B2 | | 12/2019 |
| JP | 2022-046117 | A | | 3/2022 |
| JP | 2022-114519 | A | | 8/2022 |
| JP | 2022-135446 | A | | 9/2022 |

OTHER PUBLICATIONS

Office Action dated Aug. 5, 2025, issued in corresponding Japanese Patent Application No. JP2022-062763, 9 pages.
Japanese Office Action dated Nov. 18, 2025, issued in corresponding JP Application No. JP2022-062763.

* cited by examiner

*Primary Examiner* — Kara E. Geisel
*Assistant Examiner* — Christina I Xing
(74) *Attorney, Agent, or Firm* — Rimon P.C.

(57) ABSTRACT

In a substrate processing apparatus according to the invention, a light source and an imager are arranged at a position distant from an object to be imaged such as a substrate, whereas a head unit is arranged at an imaging position. Diffused light is generated by diffusing and reflecting illumination light from the light source and illuminated a peripheral edge part of the object to be imaged. Further, reflected light from the peripheral edge part illuminated with the diffused light is guided to the imager, whereby the peripheral edge part is imaged by the imager.

4 Claims, 13 Drawing Sheets

IMAGING DEVICE, INSPECTION DEVICE, INSPECTION METHOD AND SUBSTRATE PROCESSING APPARATUS

CROSS REFERENCE TO RELATED APPLICATION

The disclosure of Japanese Patent Application No. 2022-62763 filed on Apr. 5, 2022 including specification, drawings and claims is incorporated herein by reference in its entirety.

BACKGROUND OF THE INVENTION

1. Field of the Invention

This invention relates to an imaging device for imaging a peripheral edge part of an object to be imaged such as a semiconductor wafer, an inspection technique for inspecting the object to be imaged based on a peripheral edge part image captured by the imaging device and a substrate processing apparatus equipped with the imaging device.

2. Description of the Related Art

A processing system is known which applies various types of processing to a peripheral edge part of an object to be imaged such as a semiconductor wafer. For example, in JP 2017-139492A, a bevel part of a substrate is washed after a coating agent is spread on the substrate. Further, after a bevel washing step, an inspection step is performed in which a surface state of the bevel part is inspected to determine the presence or absence of the coating agent on the bevel part. This inspection step is performed by a device different from a device for performing the bevel washing step.

SUMMARY OF INVENTION

In the system described in JP 2017-139492A, a substrate processing apparatus for performing the bevel washing step and an inspection device for performing the inspection step are separated from each other. Thus, there is a time difference between the occurrence of a failure in the substrate processing apparatus and the finding of the failure in the inspection device. This became a factor of yield reduction in some cases.

Accordingly, to solve the above problem, it is considered to incorporate an inspection device into a substrate processing apparatus. However, in the inspection device, a CMOS (Complementary Metal Oxide Semiconductor) camera is arranged on a peripheral edge part of a substrate and the peripheral edge part of the substrate is imaged by this camera. Further, in the case of inspecting a surface state of a bevel part, a camera for observing the bevel part from various directions and a light source for illuminating the bevel part from various directions to be compatible with the camera are necessary. That is, in the conventional inspection device, constituent elements arranged near the peripheral edge part of the substrate are relatively large and the incorporation of the inspection device into the substrate processing apparatus has been difficult.

This invention was developed in view of the above problem and aims to provide an imaging device excellent in versatility and capable of satisfactorily imaging a peripheral edge part of an object to be imaged such as a semiconductor wafer, an inspection technique capable of inspecting the peripheral edge part of the object to be imaged using the imaging device and a substrate processing apparatus equipped with the imaging device.

A first aspect of the invention is an imaging device for imaging a peripheral edge part of an object to be imaged. The imaging device comprises: a light source configured to irradiate illumination light toward an imaging position for imaging the peripheral edge part of the object to be imaged from a position distant from the object to be imaged; a head unit including a diffusing illuminator and a guide unit, the diffusing illuminator being configured to illuminate the peripheral edge part with diffused light generated by diffusing and reflecting the illumination light from the light source at the imaging position, the guide unit being configured to guide reflected light reflected by the peripheral edge part illuminated with the diffused light to the position distant from the object to be imaged; and an imager configured to obtain an image of the peripheral edge part by receiving the reflected light guided by the guide unit at the position distant from the object to be imaged.

A second aspect of the invention is an inspection device for inspecting a peripheral edge part of an object to be imaged. The inspection device comprises: the imaging device; a mover configured to move the object to be imaged in a given direction with respect to the head unit while the head unit is positioned at the imaging position; an image acquirer configured to obtain a peripheral edge part image of the object to be imaged along the given direction from a plurality of images of the peripheral edge part obtained by the imager while the object to be imaged is relatively moved with respect to the head unit by the mover; and an inspector configured to inspect the peripheral edge part based on the peripheral edge part image.

A third aspect of the invention is an inspection method for inspecting a peripheral edge part of an object to be imaged. The inspection method comprises: relatively moving the object to be imaged in a given direction with respect to the head unit of the imaging device according to claim 1 while positioning the head unit to the imaging position; obtaining a peripheral edge part image of the object to be imaged along the given direction by synthesizing a plurality of images obtained by the imager while the object to be imaged is relatively moved with respect to the head unit; and inspecting the peripheral edge part based on the peripheral edge part image.

A fourth aspect of the invention is a substrate processing apparatus. The substrate processing apparatus comprises: a rotating mechanism configured to hold and rotate a substrate; a processing mechanism configured to process a peripheral edge part of the substrate by supplying a processing liquid to the peripheral edge part of the substrate rotated by the rotating mechanism; and an imaging device configured to image the peripheral edge part before or after the peripheral edge part is processed, wherein the imaging device includes: a light source configured to irradiate illumination light toward an imaging position for imaging the peripheral edge part of the substrate from a position distant from the peripheral edge part of the substrate; a head unit including a diffusing illuminator and a guide unit, the diffusing illuminator being configured to illuminate the peripheral edge part with diffused light generated by diffusing and reflecting the illumination light from the light source at the imaging position, the guide unit being configured to guide reflected light reflected by the peripheral edge part illuminated with the diffused light to the position distant from the substrate; and an imager configured to obtain an image of the peripheral edge part by receiving the reflected light guided by the guide unit at the position distant from the peripheral edge part of the substrate.

In the invention thus configured, the light source and the imager are arranged at the position distant from the object to be imaged such as a substrate, whereas the head unit is arranged at the imaging position. The diffused light generated by diffusing and reflecting the illumination light from the light source by the diffusing illuminator illuminates the peripheral edge part. Further, the reflected light reflected by the peripheral edge part illuminated by the diffused light is guided to the imager by the guide unit. In this way, the peripheral edge part is imaged by the imager.

According to this invention, a peripheral edge part of an object to be imaged such as a semiconductor wafer can be satisfactorily imaged and, moreover, the imaging device excellent in versatility is obtained. Further, the inspection device can be reduced in size and is easily incorporated into a substrate processing apparatus by using this imaging device.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
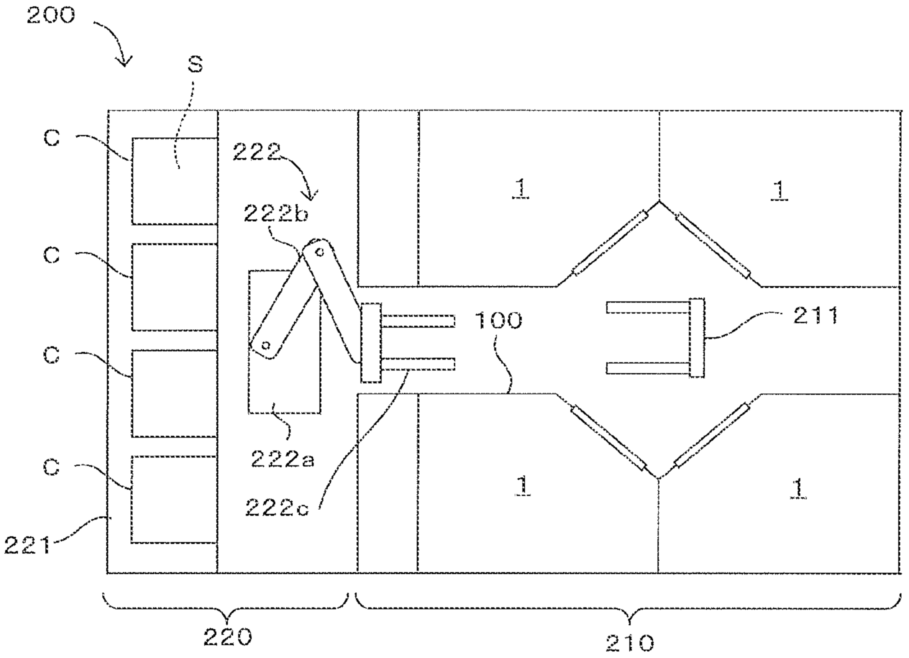
FIG. 1 is a diagram showing a substrate processing system equipped with a first embodiment of a substrate processing apparatus according to the invention.

FIG. 1 is a diagram showing a substrate processing system equipped with a first embodiment of a substrate processing apparatus according to the invention. The substrate processing system 200 includes a substrate processing station 210 for processing the substrate W and an indexer station 220 coupled to this substrate processing station 210. The indexer station 220 includes a container holder 221 capable of holding a plurality of containers C for housing the substrates W (FOUPs (Front Opening Unified Pods), SMIF (Standard Mechanical Interface) pods, OCs (Open Cassettes) for housing a plurality of the substrates W in a sealed state), and an indexer robot 222 for taking out an unprocessed substrate W from the container C by accessing the container C held by the container holder 121 and housing a processed substrate W in the container C. A plurality of the substrates W are housed substantially in a horizontal posture in each container C. In this specification, a pattern formation surface (one principal surface) formed with the pattern is referred to as a "front surface" and the other principal surface not formed with the pattern on an opposite side is referred to as a "back surface". Further, a surface facing down is referred to as a "lower surface" and a surface facing up is referred to as an "upper surface". Further, in this specification, the "pattern formation surface" means a surface of the substrate where an uneven pattern is formed in an arbitrary region regardless of whether the surface is flat, curved or uneven.

The indexer robot 222 includes a base 222*a* fixed to an apparatus housing, an articulated arm 222*b* provided rotatably about a vertical axis with respect to the base 222*a*, and a hand 222*c* mounted on the tip of the articulated arm 222*b*. The hand 222*c* is structured such that the substrate W can be placed and held on the upper surface thereof. Such an indexer robot including the articulated arm and the hand for holding the substrate is not described in detail since being known.

The substrate processing station 210 includes a substrate conveyor robot 211 arranged substantially in a center in a plan view and a plurality of processing units 1 arranged to surround this substrate conveyor robot 11. Specifically, the plurality of processing units 1 are arranged to face a space where the substrate conveyor robot 111 is arranged. The substrate conveyor robot 211 randomly accesses these processing units 1 and transfers the substrates W. On the other hand, each processing unit 1 performs a predetermined processing to the substrate W.

In this embodiment, these processing units 1 have the same function.

Figure 2:
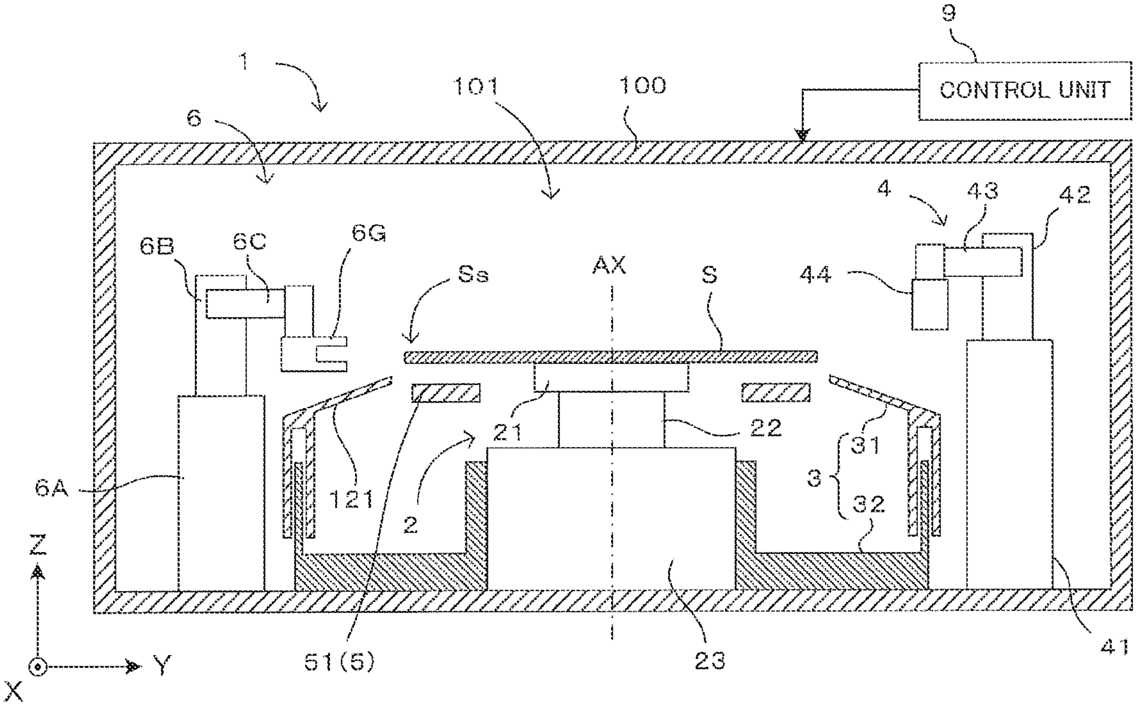
FIG. 2 is a diagram schematically showing the configuration of the first embodiment of the substrate processing apparatus.
Figure 3:
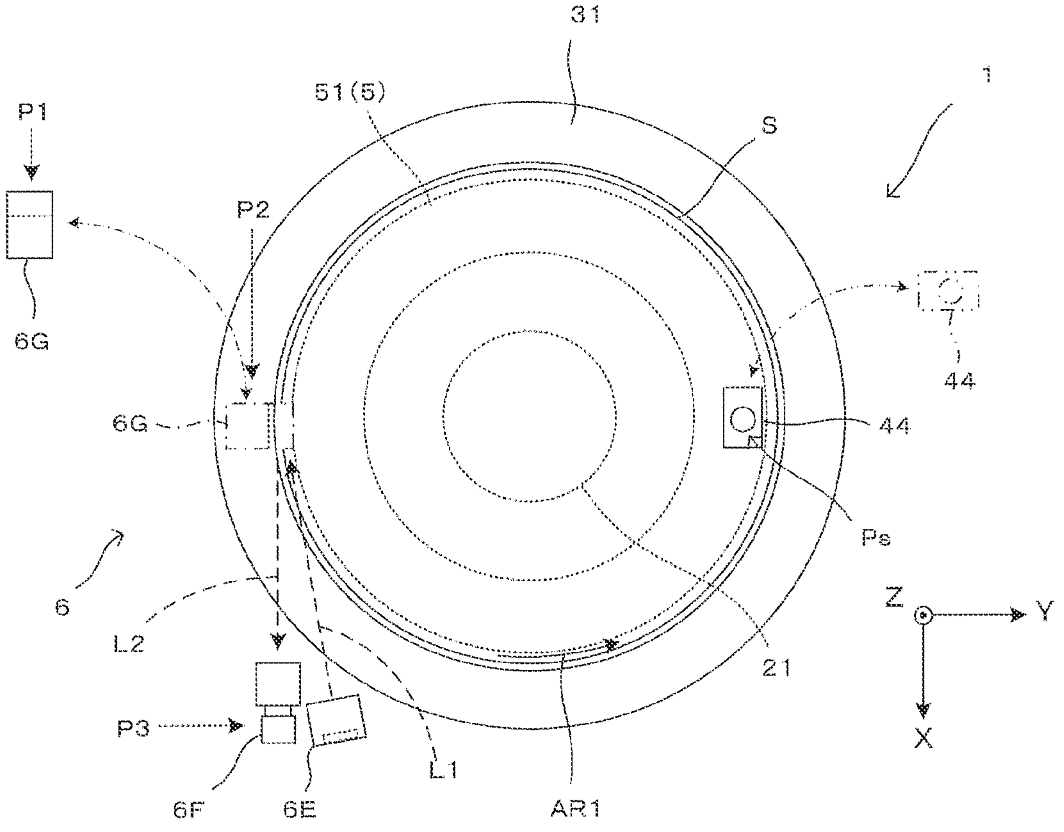
FIG. 3 is a plan view of a part of the substrate processing apparatus viewed from above.
Figure 4:
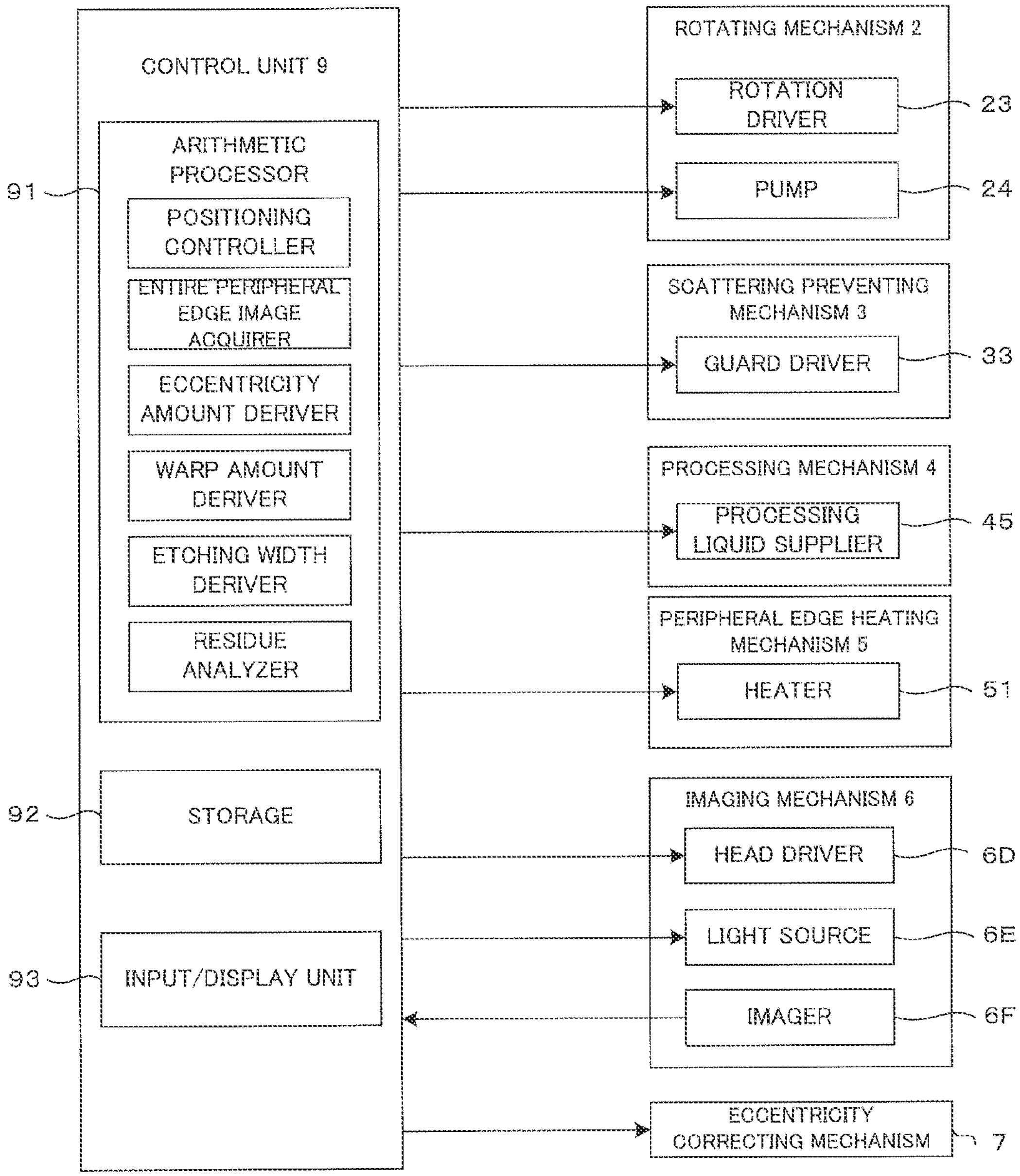
FIG. 4 is a block diagram showing the electrical configuration of the substrate processing apparatus shown in FIGS. 2 and 3.

FIG. 2 is a diagram schematically showing the configuration of the first embodiment of the substrate processing apparatus. FIG. 3 is a plan view of a part of the substrate processing apparatus viewed from above. FIG. 4 is a block diagram showing the electrical configuration of the substrate processing apparatus shown in FIGS. 2 and 3. In FIGS. 2 and 3 and each figure to be referred to below, each component may be shown with the dimensions and number thereof exaggerated or simplified to facilitate understanding. Further, to clarify a directional relationship, a coordinate system in which a Z axis extends in a vertical direction and an XY plane is a horizontal plane is appropriately added in each figure.

A substrate processing apparatus (processing unit) 1 is provided with a rotating mechanism 2, a scattering preventing mechanism 3, a processing mechanism 4, a peripheral edge heating mechanism 5 and an imaging mechanism 6. Each of these mechanisms 2 to 6 is electrically connected to a control unit 9 for controlling the entire apparatus while being housed in an internal space 101 of a processing chamber 100. Each mechanism 2 to 6 operates in response to an instruction from the control unit 9.

A unit similar to a general computer can be, for example, adopted as the control unit 9. That is, in the control unit 9, a CPU serving as a main controller performs an arithmetic processing in accordance with a procedure described in a program, thereby controlling each component of the substrate processing apparatus 1. In this way, the substrate processing apparatus 1 performs a bevel etching processing as an example of a "processing" of the invention by supplying a processing liquid to a peripheral edge part of the upper surface of the substrate S in the processing chamber. Note that the detailed configuration and operation of the control unit 9 are described in detail later. Further, although the control unit 9 is provided for each substrate processing apparatus 1 in this embodiment, a plurality of the substrate processing apparatuses 1 may be controlled by one control unit. Further, the substrate processing apparatus 1 may be controlled by a control unit (not shown) for controlling the entire substrate processing system 200.

The rotating mechanism 2 rotates the substrate S in a rotational direction AR1 (FIG. 3) while holding the substrate W substantially in a horizontal posture with the surface of the substrate S facing up. The rotating mechanism 2 rotates the substrate S about a vertical axis of rotation AX passing through a center of the principal surface of the substrate S. The rotating mechanism 2 includes a spin chuck 21, which is a disk-like member smaller than the substrate S. The spin chuck 21 is so provided that the upper surface thereof is substantially horizontal and a center axis thereof coincides with the axis of rotation AX. A rotary shaft 22 is coupled to the lower surface of the spin chuck 21. The rotary shaft 22 extends in the vertical direction with an axis thereof aligned with the axis of rotation AX. Further, a rotation driver (e.g. motor) 23 is connected to the rotary shaft 22. The rotation driver 23 rotates and drives the rotary shaft 22 about an axis thereof in response to a rotation command from the control unit 9. Therefore, the spin chuck 21 is rotatable about the axis of rotation AX together with the rotary shaft 22. The rotation driver 23 and the rotary shaft 22 provide a function of rotating the spin chuck 21 about the axis of rotation AX.

An unillustrated through hole is provided in a central part of the spin chuck 21 and communicates with an internal space of the rotary shaft 22. A pump 24 (FIG. 4) is connected to the internal space via a pipe having a valve (not shown) disposed therein. The pump 24 and the valve are electrically connected to the control unit 9 and operate in response to a command from the control unit 9. In this way, a negative pressure and a positive pressure are selectively applied to the spin chuck 21. For example, if the pump 24 applies the negative pressure to the spin chuck 21 with the substrate S placed substantially in a horizontal posture on the upper surface of the spin chuck 21, the spin chuck 21 sucks and holds the substrate S from below. On the other hand, if the pump 24 applies the positive pressure to the spin chuck 21, the substrate S can be removed from the upper surface of the spin chuck 21. Further, if the suction of the pump 24 is stopped, the substrate S is horizontally movable on the upper surface of the spin chuck 21.

The scattering preventing mechanism 3 includes a substantially tubular cup 31 provided to surround the outer periphery of the substrate S held on the spin chuck 21 as shown in FIG. 3 and a liquid receiver 32 provided below an outer peripheral part of the cup 31. A guard driver 33 (FIG. 4) operates in response to a control command from the control unit 9, whereby the cup 31 is raised and lowered. If the cup 31 is positioned at a lower position, an upper end part of the cup 31 is located below a peripheral edge part Ss of the substrate S held on the spin chuck 21 as shown in FIG. 2. Conversely, if the cup 31 is positioned at an upper position, the upper end part of the cup 31 is located above the peripheral edge part Ss of the substrate S.

When the cup 31 is at the lower position, the substrate S held on the spin chuck 21 is exposed to the outside of the cup 31 as shown in FIG. 2. This prevents the cup 31 from becoming a hindrance, for example, when the substrate S is carried to and from the spin chuck 21.

On the other hand, when the cup 31 is at the upper position, the inner peripheral surface of the cup 31 surrounds the outer periphery of the substrate S held on the spin chuck 21. In this way, droplets of the processing liquid shaken off from the peripheral edge part Ss of the substrate S during the bevel etching processing to be described later can be prevented from being scattered in the processing chamber 100. Further, the processing liquid can be reliably collected. That is, the droplets of the processing liquid shaken off from the peripheral edge part Ss of the substrate S by the rotation of the substrate S adhere to the inner peripheral surface of the cup 31, flow down and are gathered and collected by the liquid receiver 32 arranged below the cup 31.

The processing mechanism 4 includes a base 41, a pivot shaft 42, an arm 43 and a processing liquid nozzle 44. The base 41 is fixed to the processing chamber 100. The pivot shaft 42 is freely rotatably provided on this base 41. The arm 43 horizontally extends from the pivot shaft 42, and the processing liquid nozzle 44 is attached to the tip of the arm 43. The pivot shaft 42 turns in response to a control command from the control unit 9, whereby the arm 43 swings and the processing liquid nozzle 44 on the tip of the arm 43 moves between a retracted position (two-dot chain line position in FIG. 3) where the processing liquid nozzle 44 is retracted laterally from above the substrate S and a processing position (solid line position in FIG. 3) above the peripheral edge part of the substrate S as shown in FIG. 3.

The processing liquid nozzle 44 is connected to a processing liquid supplier 45 (FIG. 4). If the processing liquid supplier 45 supplies the processing liquid toward the processing liquid nozzle 44 in response to a supply command from the control unit 9, the processing liquid is discharged from the processing liquid nozzle 44 to a processing start position Ps. This processing start position Ps is one point on a movement path of the peripheral edge part Ss of the substrate S. Accordingly, the spin chuck 21 rotates while the processing liquid nozzle 44 is discharging the processing liquid, whereby each part of the peripheral edge part Ss of the substrate S receives the supply of the processing liquid while passing through the processing start position Ps. As a result, the bevel etching processing by the processing liquid is performed for the entire peripheral edge part Ss of the substrate S.

The peripheral edge heating mechanism 5 is constituted by an annular heater 51. The heater 51 includes a built-in heating element extending in a circumferential direction of the substrate S along a peripheral edge part of the lower surface of the substrate S. If a heating command is given to this heater 51 from the control unit 9, the peripheral edge part Ss of the substrate S is heated from below by heat released from the heating element. In that way, the temperature of the peripheral edge part Ss increases to a value suitable for the bevel etching processing.

The imaging mechanism 6 corresponds to a first embodiment of an "imaging device" of the invention. The imaging mechanism 6 includes a base 6A, a pivot shaft 6B, an arm 6C, a head driver 6D, a light source 6E, an imager 6F and a head unit 6G. The base 6A is fixed to the processing chamber 100. The pivot shaft 6B is freely rotatably provided on this base 6A. The arm 6C horizontally extends from the pivot shaft 6B, and the head unit 6G is attached to the tip of the arm 6C. If a control command is given to the head driver 6D (FIG. 4) for driving the arm 6C from the control unit 9, the head driver 6D swings the arm 6C as shown by a one-dot chain line in FIG. 3 in response to this command. In this way, the head unit 6G attached to the tip of the arm 6C reciprocates between a retracted position P1 (solid line position in FIG. 3) where the head unit 6G is retracted laterally from above the substrate S and an imaging position P2 (one-dot chain line position in FIG. 3) where the peripheral edge part Ss of the substrate S is imaged.

As shown in FIG. 3, the light source 6E and the imager 6F are provided at a separated position P3 separated in an X direction from the imaging position P2. This separated position P3 is separated from the substrate S and the respective components (rotating mechanism 2, scattering preventing mechanism 3, processing mechanism 4, peripheral edge heating mechanism 5) for performing the bevel etching processing such as the cup 31 and the like. The light source 6E irradiates illumination light L1 toward the imaging position P2 from the outside of the cup 31. At this time, the cup 31 is positioned at the lower position, the head unit 6G is positioned at the imaging position P2 and the illumination light L1 is incident on the head unit 6G. This illumination light L1 is diffused and reflected by the head unit 6G. The peripheral edge part Ss of the substrate S is illuminated with diffused light generated in this way. Then, reflected light L2 reflected by the peripheral edge part Ss of the substrate S is further reflected by the head unit 6G. The reflected light L2 is guided toward the separated position P3 from the head unit 6G and incident on the imager 6F. In this way, the imager 6F obtains an image of the peripheral edge part Ss of the substrate S and sends image data thereof to the control unit 9.

As described above, the head unit 6G has both a diffusing/illuminating function of receiving the illumination light L1 from the light source 6E, generating the diffused light and illuminating the peripheral edge part Ss of the substrate by the diffused light and a guiding function of guiding the reflected light L2 reflected by the peripheral edge part Ss to the imager 6F. The configuration and operation of the head unit 6G are described below with reference to FIGS. 5 to 8.

Figure 5:
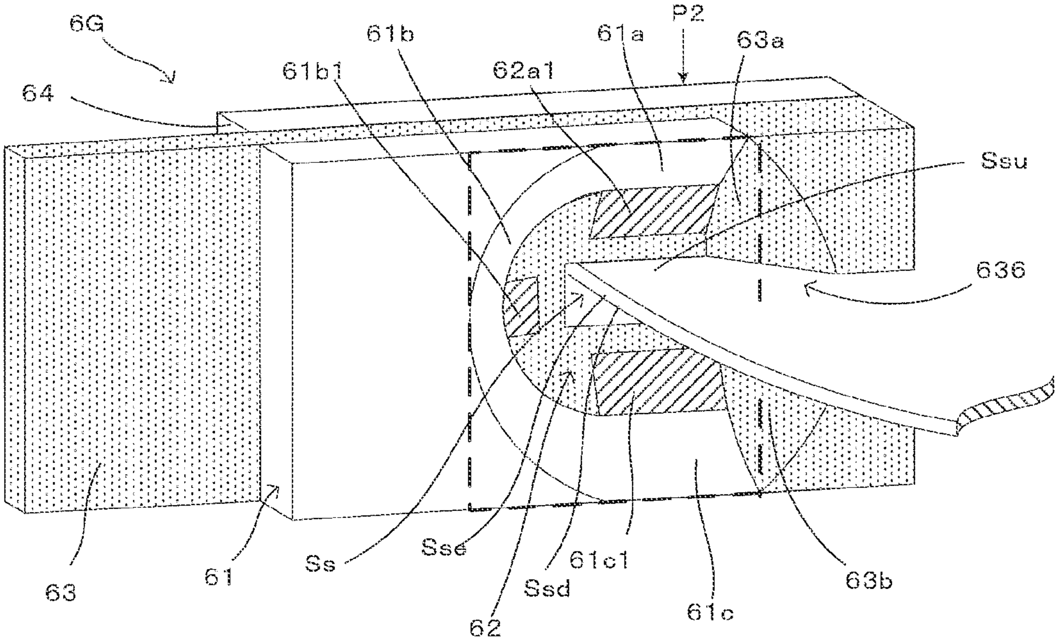
FIG. 5 is a perspective view showing a head unit of an imaging mechanism.
Figure 6:
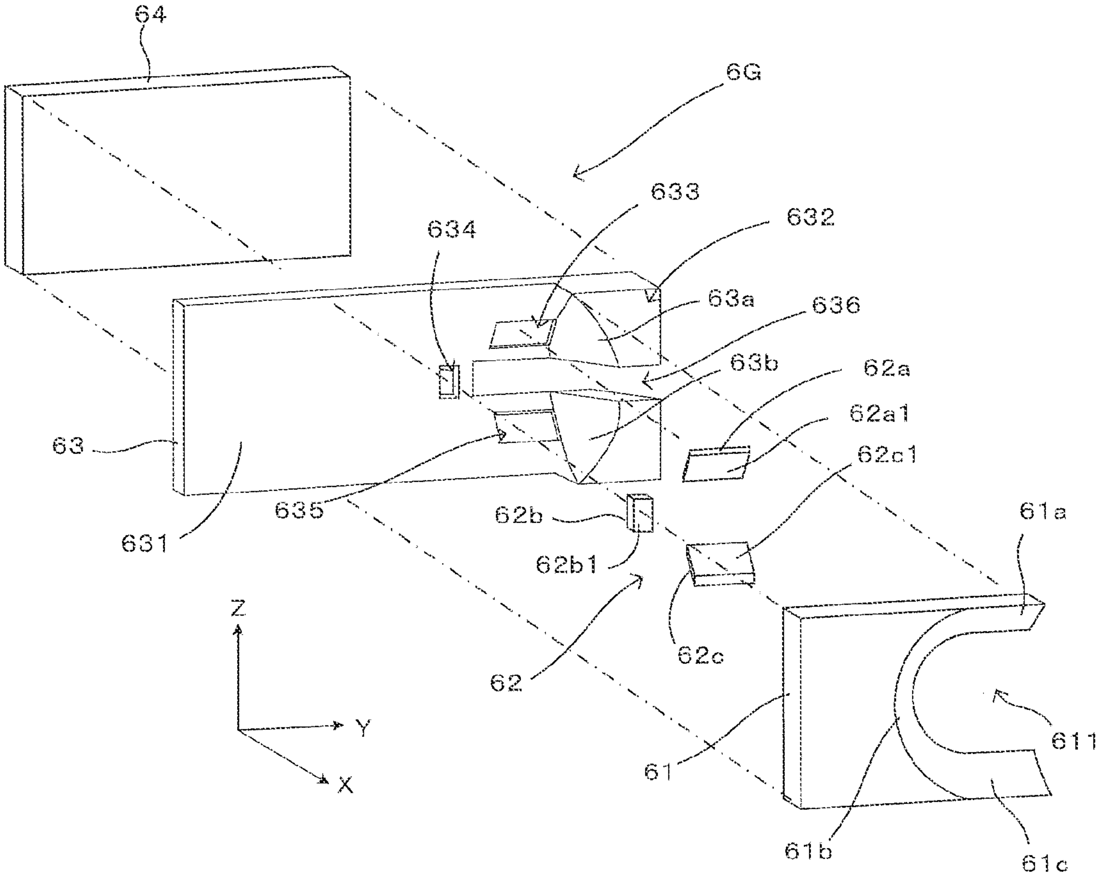
FIG. 6 is an exploded assembly perspective view of the head unit shown in FIG. 5.

FIG. 5 is a perspective view showing the head unit of the imaging mechanism. FIG. 6 is an exploded assembly perspective view of the head unit shown in FIG. 5. The head unit 6G includes a diffusing illuminator 61 having three diffusing surfaces, a guide unit 62 composed of three mirror members 62*a* to 62*c*, a holder 63 having two diffusing surfaces 63*a*, 63*b* and a support 64. Note that, to clearly show the holder 63, regions corresponding to the holder 63 are dotted in FIG. 5 (and FIGS. 7A, 7C and 7D to be described later). Further, a thick broken line region in FIG. 5 (and FIGS. 7A, 7C and 7D to be described later) indicates a range illuminated by the illumination light L1, i.e. an illumination region by the light source 6E.

The holder 63 is, for example, made of PEEK (polyetheretherketone) and includes, as shown in FIG. 6, a plate section 631 extending in a horizontal direction Y orthogonal to the X direction and a projecting section 632 projecting in a (+X) direction on a (+Y) direction side of the plate section 631, i.e. on the substrate side. As shown in FIGS. 5 and 6, the holder 63 is provided with a cut 636 extending in the Y direction from an end surface of the projecting section 632 on the (+Y) direction side to a partial region of the plate section 631. A dimension of the cut 636 in the vertical direction is larger than a thickness of the substrate S. As shown in FIG. 5, if the head unit 6G is positioned at the imaging position P2, the cut 636 enters the peripheral edge part Ss of the substrate S and a region further radially inward (right side in FIG. 5) of the peripheral edge part Ss. In such a positioned state, a region vertically above the cut 636, a region on a (−Y) direction side of the cut 636 and a region vertically below the cut 636, out of the plate section 631, are respectively facing an upper surface Ssu, a side surface Sse and a lower surface Ssd of the peripheral edge part Ss of the substrate S. In the region vertically above the cut 636, the region on the (−Y) direction side of the cut 636 and the region vertically below the cut 636, mirror mounting sections 633 to 635 are respectively provided. The mirror members 62*a* to 62*c* are respectively mounted in the mirror mounting sections 633 to 635. Note that, in this embodiment, the mirror members 62*a* to 62*c* are made of Si (silicon) in consideration of chemical resistance, heat resistance and the like.

On the other hand, in the projecting section 632, an inclined surface inclined toward the mirror member 62*a* is formed in the region vertically above the cut 636, and this inclined surface functions as the diffusing surface 63*a*. That is, the diffusing surface 63*a* generates upper surface diffused light propagating toward the upper surface Ssu of the peripheral edge part Ss of the substrate S by diffusing and reflecting part of the illumination light L1, and corresponds to an example of a "second upper diffusing surface" of the invention. Note that the diffused light generated on the diffusing surface 63*a* is described later together with diffused light generated on the diffusing surface 61*a* functioning as a "first upper diffusing surface" of the invention with reference to FIG. 7A.

Further, an inclined surface inclined toward the mirror member 62*c* is formed in the region vertically below the cut 636, and this inclined surface functions as the diffusing surface 63*b*. That is, the diffusing surface 63*b* generates lower surface diffused light propagating toward the lower surface Ssd of the peripheral edge part Ss of the substrate S by diffusing and reflecting part of the illumination light L1, and corresponds to an example of a "second lower diffusing surface" of the invention. Note that the diffused light generated on the diffusing surface 63*b* is described later together with diffused light generated on the diffusing surface 61*c* functioning as a "first lower diffusing surface" of the invention with reference to FIG. 7C (upper surface region radially inward of and adjacent to the peripheral edge part Ss).

As just described, the holder 63 having the mirror members 62*a* to 62*c* mounted thereon is integrated with the diffusing illuminator 61 arranged on a (+X) direction side and the support 64 arranged on a (−X) direction side while being sandwiched by the diffusing illuminator 61 and the support 64.

The diffusing illuminator 61 is, for example, made of PTFE (polytetrafluoroethylene). The diffusing illuminator 61 has a plate shape extending in the horizontal direction Y and is formed with a cut 611 in an end part on the (+Y) direction side as shown in FIGS. 5 and 6. This cut 611 has a shape obtained by turning a U shape clockwise by 90° when viewed from the (+X) direction side. Further, in the diffusing illuminator 61, an inclined surface is provided along the cut 611. The inclined surface is a tapered surface finished to be inclined in the (−X) direction, in which the illumination light L1 propagates, toward the cut 611. Particularly, out of this tapered surface, a region vertically above the cut 611, a region on the (−Y) direction side of the cut 611 and a region vertically below the cut 611 respectively function as the diffusing surfaces 61*a* to 61*c*. As shown in FIG. 5, the diffusing illuminator 61 is so positioned with respect to the holder 63 that the diffusing surfaces 61*a* to 61*c* are located in the illumination region (thick broken line region of FIG. 5) by the light source 6E and the diffusing surfaces 61*a*, 61*c* are respectively adjacent to the diffusing surfaces 63*a*, 63*b*.

Figure 7A:
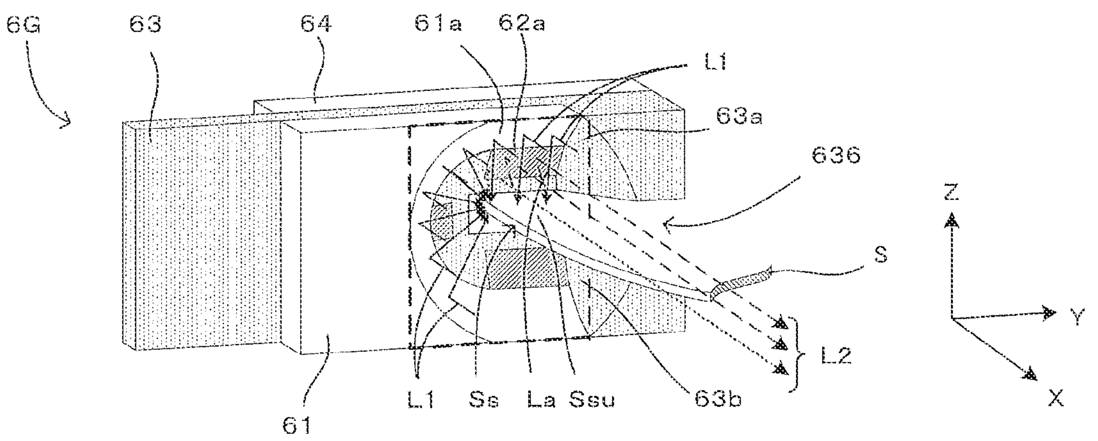
FIG. 7A is a view schematically showing how light contributing to upper surface imaging propagates.
Figure 7B:
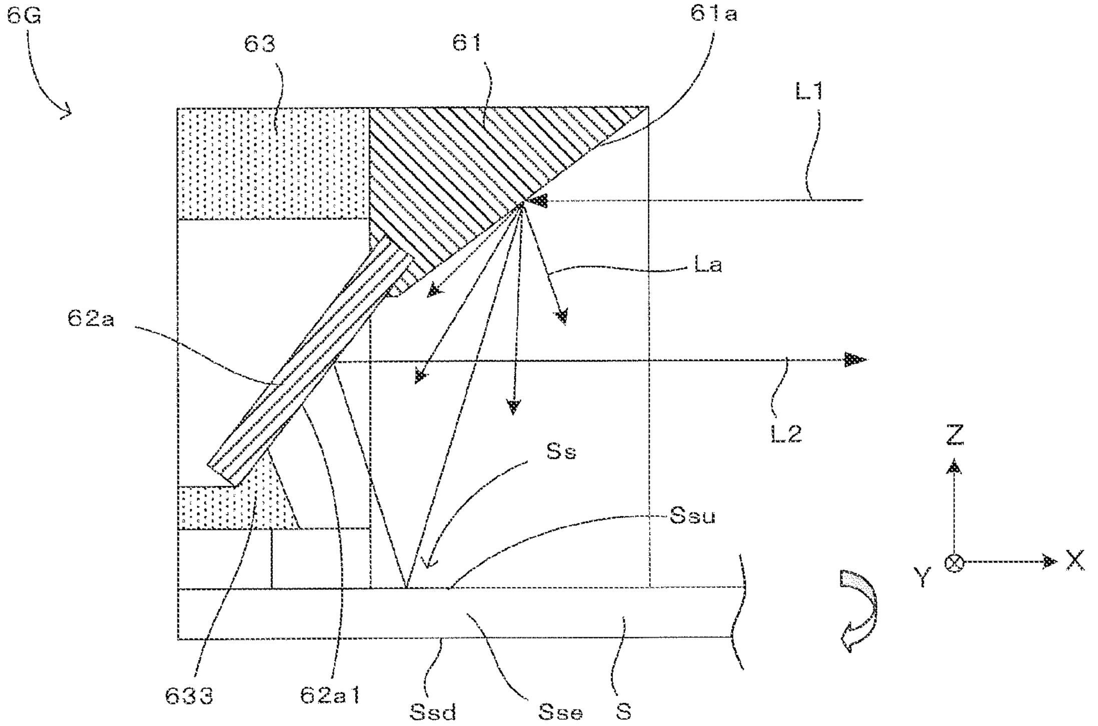
FIG. 7B is a partial sectional enlarged view of FIG. 7A.

FIG. 7A is a view schematically showing how light contributing to upper surface imaging propagates. FIG. 7B is a partial sectional enlarged view of FIG. 7A. The diffusing surfaces 61*a*, 63*a* generate upper surface diffused light La propagating toward the upper surface of the substrate S including the peripheral edge part Ss by diffusing and reflecting part of the illumination light L1 and correspond to an example of the "first upper diffusing surface" of the invention. Further, similarly to the diffusing surface 61*a*, the diffusing surface 63*a* also generates the upper surface diffused light La. These rays of the upper surface diffused light La are partially reflected by the upper surface of the peripheral edge part Ss and an adjacent region (upper surface region radially inward of and adjacent to the peripheral edge part Ss) of the peripheral edge part Ss, whereby the reflected light L2 is generated. This reflected light L2 includes reflected light (see dotted line arrow in FIG. 7A) reflected by the upper surface Ssu of the peripheral edge part Ss and reflected light (see broken line arrows in FIG. 7A) reflected by the upper surface of the adjacent region of the peripheral edge part Ss, and those rays of the reflected light L2 are guided to the separated position P3 after being reflected by a reflecting surface 62*a*1 of the mirror member 62*a*. That is, the reflecting surface 62*a*1 functions as an "upper reflecting surface" of the invention. Then, the reflected light is received by the imager 6F. As a result, images of the upper surfaces of the peripheral edge part Ss and the adjacent region (hereinafter, referred to as "upper surface images") can be captured by the imager 6F.

Figure 7C:
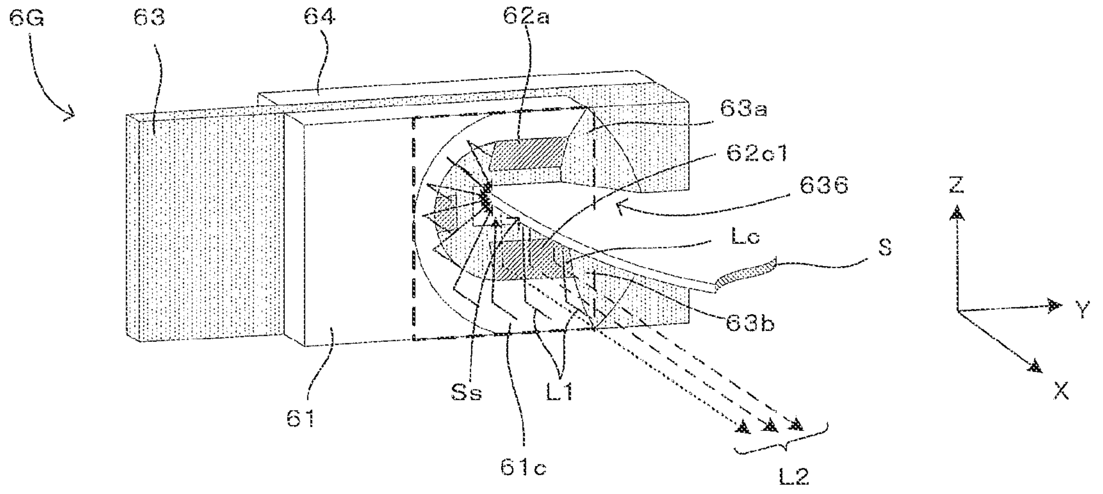
FIG. 7C is a view schematically showing how light contributing to lower surface imaging propagates.

FIG. 7C is a view schematically showing how light contributing to lower surface imaging propagates. The diffusing surfaces 61*c*, 63*b* are located below the diffusing surfaces 61*a*, 63*a* across the substrate S and illuminate the lower surfaces of the peripheral edge part Ss and the adjacent region with the lower surface diffused light. That is, the diffusing surface 61*c* corresponds to an example of the "first lower diffusing surface" of the invention and, as shown in FIG. 7C, generates lower surface diffused light Lc propagating toward the lower of the substrate S including the peripheral edge part Ss by diffusing and reflecting part of the illumination light L1. The diffusing surface 63*b* is also similar in generating the lower surface diffused light Lc. These rays of the lower surface diffused light Lc are partially reflected by the lower surfaces of the peripheral edge part Ss and the adjacent region of the substrate S, whereby the reflected light L2 is generated. This reflected light L2 includes reflected light (see dotted line arrow in FIG. 7C) reflected by the lower surface Ssd of the peripheral edge part Ss and reflected light (see broken line arrows in FIG. 7C) reflected by the lower surface of the adjacent region of the peripheral edge part Ss, and those rays of the reflected light L2 are guided to the separated position P3 after being reflected by a reflecting surface 62*c*1 of the mirror member 62*c*. That is, the reflecting surface 62*c*1 functions as a "lower reflecting surface" of the invention. The reflected light L2 is received by the imager 6F. As a result, images of the lower surfaces of the peripheral edge part Ss and the adjacent region (hereinafter, referred to as "lower surface images") can be captured by the imager 6F.

Figure 7D:
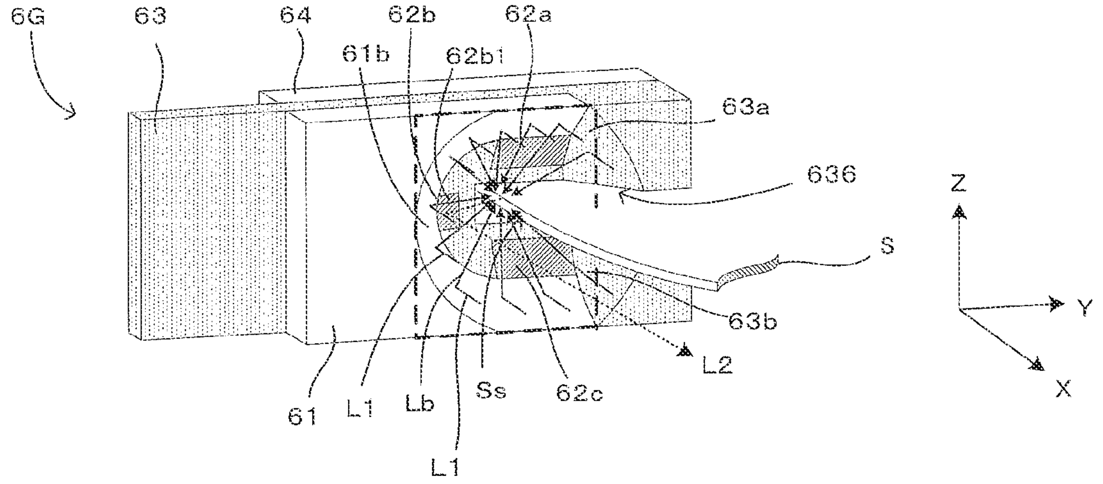
FIG. 7D is a view schematically showing how light contributing to side surface imaging propagates.

FIG. 7D is a view schematically showing how light contributing to side surface imaging propagates. As shown in FIG. 7D, the diffusing surface 61*b* generates side surface diffused light Lb propagating toward the side surface Sse (FIG. 5) of the substrate S by diffusing and reflecting part of the illumination light L1, and corresponds to an example of a "lateral diffusing surface" of the invention. Part of the side surface diffused light Lb is reflected by the side surface Sse of the peripheral edge part Ss, whereby the reflected light L2 is generated. This reflected light L2 includes reflected light (see dotted line arrow in FIG. 7D) reflected by the side surface Sse of the peripheral edge part Ss, and this reflected light L2 is guided to the separated position P3 after being reflected by a reflecting surface 62*b*1 of the mirror member 62*b*. In this way, the reflecting surface 62*b*1 functions as a "lateral reflecting surface" of the invention.

Figure 8:
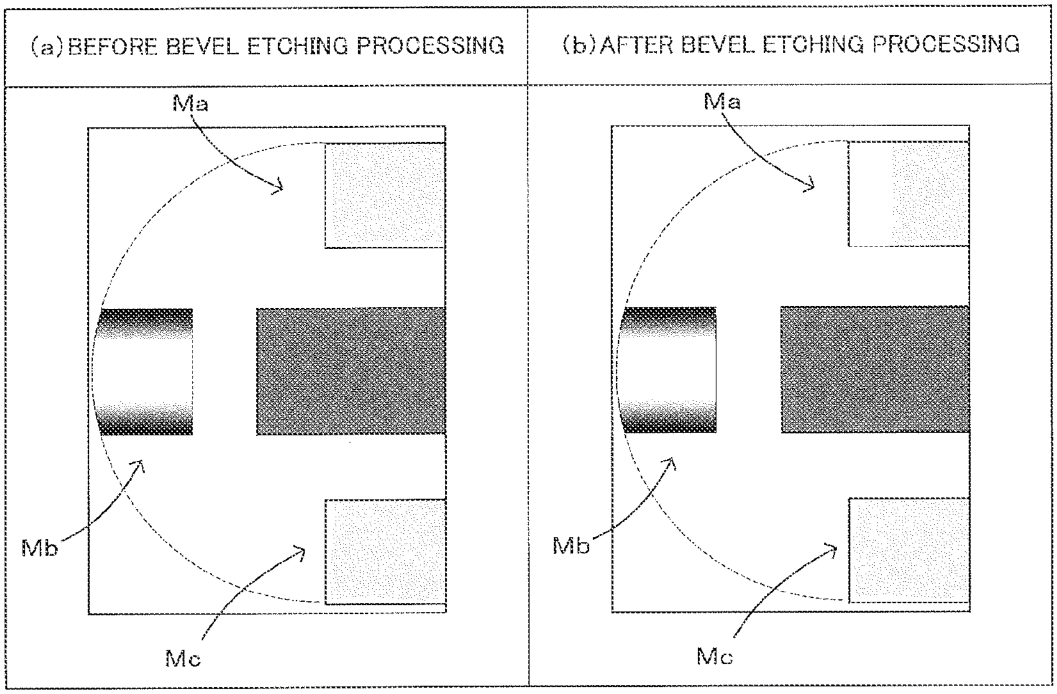
FIG. 8 is a chart schematically showing images of a peripheral edge part and an adjacent region of a substrate captured by an imager.

The imager 6F includes an observation lens system constituted by an object-side telecentric lens and a CMOS camera. Accordingly, only beams parallel to an optical axis of the observation lens system, out of the above reflected light L2, are incident on a sensor surface of the CMOS camera, and images of the peripheral edge part Ss and the adjacent region of the substrate S are formed on the sensor surface. In this way, the imager 6F images the peripheral edge part Ss and the adjacent region of the substrate S and obtains, for example, an image (=upper surface image Ma+side surface image Mb+lower surface image Mc) shown in FIG. 8. Then, the imager 6F sends image data representing that image to the control unit 9. FIG. 8 is a chart schematically showing the images of the peripheral edge part and the adjacent region of the substrate captured by the imager, wherein (a) shows the images before the bevel etching processing and (b) shows the images after the bevel etching processing. As is clear from these images, information representing the shape of the peripheral edge part of the substrate S in the circumferential direction, a state of etching and the like can be obtained by analyzing these images. From these pieces of the information, it is possible to inspect an eccentricity amount of the substrate S placed on the spin chuck 21 with respect to the axis of rotation AX, a warp amount of the substrate S, a bevel etching result (etching width) and the like.

Accordingly, in the substrate processing apparatus 1 equipped with the imaging mechanism 6 configured as described above, the control unit 9 performs (A) a substrate inspection before the bevel etching processing, (B) an alignment processing, (C) a bevel etching processing after the alignment processing and (D) a substrate inspection after the bevel etching processing by controlling each component of the apparatus. This control unit 9 includes, as shown in FIG. 4, an arithmetic processor 91 for performing various types of arithmetic processing, a storage 92 for storing a basic program and image data and an input/display unit 93 for displaying various pieces of information and receiving an input from an operator. In the control unit 9, the arithmetic processor 91 serving as a main controller performs the arithmetic processing in accordance with a procedure described in the program, thereby controlling each component of the substrate processing apparatus 1 as follows. That is, as shown in FIG. 4, the arithmetic processor 91 functions as a positioning controller for positioning the head unit 6G, an entire peripheral edge image acquirer for obtaining an entire peripheral edge image, an eccentricity amount deriver for deriving an eccentricity amount of the substrate S from the entire peripheral edge image before the bevel etching processing, a warp amount deriver for deriving a warp amount of the substrate S from the entire peripheral edge image before the bevel etching processing, an etching width deriver for deriving an etching width from the entire peripheral edge image after the bevel etching processing and a residue analyzer for analyzing residues from a residue enhanced image obtained through an image processing of the entire peripheral edge image.

Note that reference numeral 7 in FIG. 4 denotes an eccentricity correcting mechanism for correcting the eccentricity of the substrate S with respect to the axis of rotation AX by moving the substrate S by the above eccentricity amount. Since a conventionally known one can be used as the eccentricity correcting mechanism, the detailed configuration of the eccentricity correcting mechanism 7 is not described here.

Figure 9:
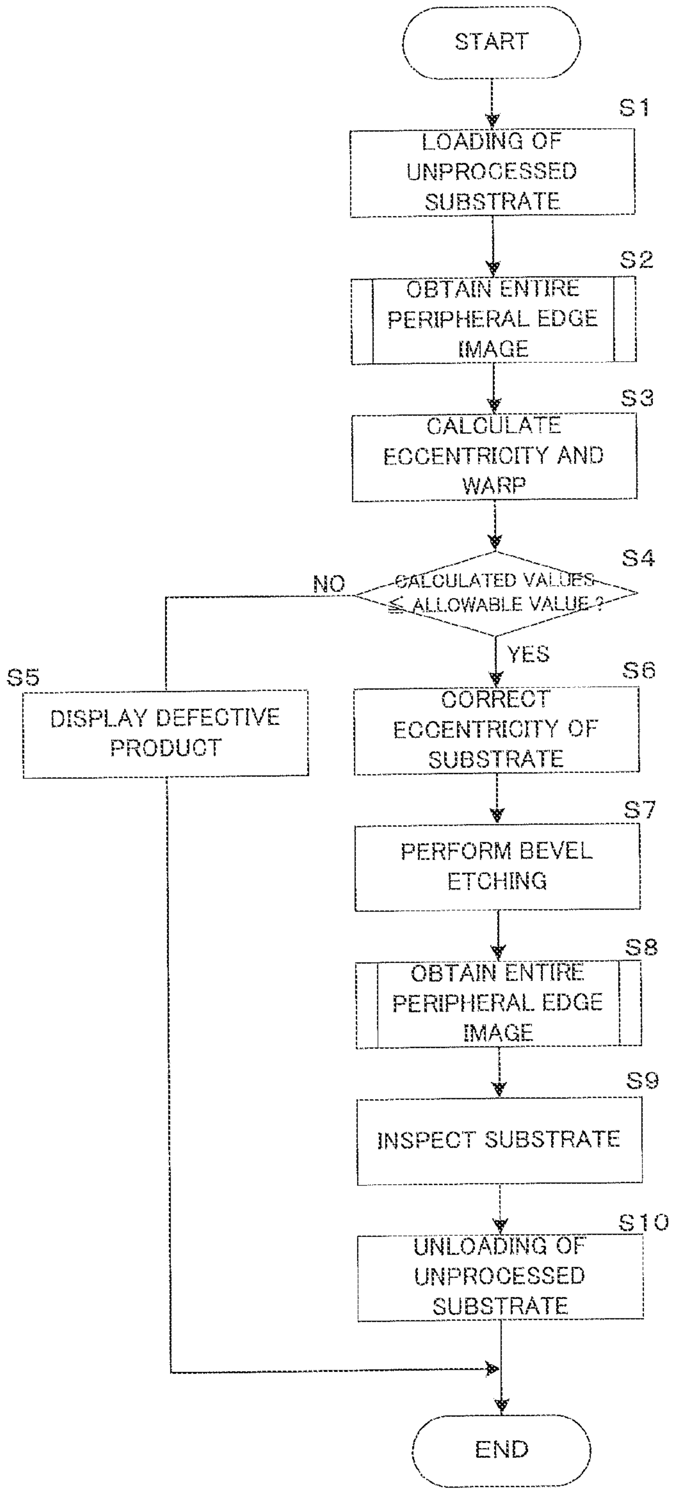
FIG. 9 is a flow chart showing a substrate processing performed in the substrate processing apparatus shown in FIG. 1.

FIG. 9 is a flow chart showing a substrate processing performed in the substrate processing apparatus shown in FIG. 1. In applying the bevel etching processing to the substrate S by the substrate processing apparatus 1, the arithmetic processor 91 causes the guard driver 33 to position the cup 31 at the lower position, thereby preventing the illumination light L1 and the reflected light L2 from being shielded by the cup 31, i.e. the occurrence of so-called vignetting. Further, the arithmetic processor 91 causes the head driver 6D to position the head unit 6G to the retracted position P1 (one-dot chain line position in FIG. 3). In this way, a conveyance space sufficient for the entrance of the hand of the substrate conveyor robot 211 is formed above the spin chuck 21. If it is confirmed that the formation of the conveyance space is completed, the arithmetic processor 91 requests the substrate conveyor robot 211 to load the substrate S and waits until an unprocessed substrate S is carried into the substrate processing apparatus 1 and placed on the upper surface of the spin chuck 21 as shown in FIG. 1. Then, the substrate S is placed on the spin chuck 21 (Step S1). Following this, the pump 24 operates to suck and hold the substrate S on the spin chuck 21.

Figure 10:
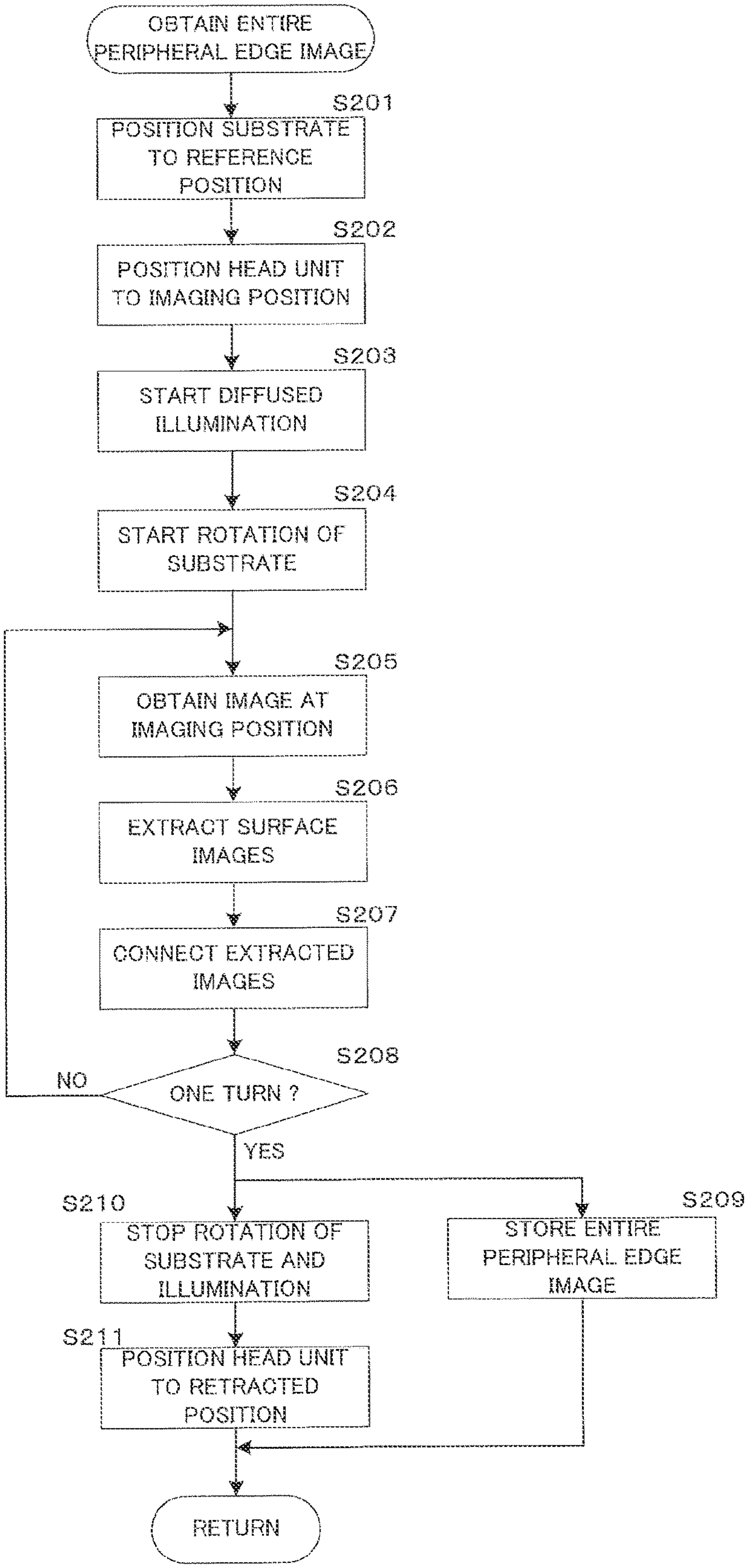
FIG. 10 is a flow chart showing an operation of obtaining an entire peripheral edge image of the substrate using the imager.

If the loading of the substrate S is completed, the substrate conveyor robot 211 is retracted from the substrate processing apparatus 1. Following that, the arithmetic processor 91 obtains an entire peripheral edge image of the substrate S (Step S2). FIG. 10 is a flow chart showing an operation of obtaining the entire peripheral edge image of the substrate using the imager. The arithmetic processor 91 controls each component of the imager 6F and the spin chuck 21 in accordance with an eccentricity amount acquisition program stored in advance in the storage 92.

The arithmetic processor 91 positions the substrate S to a reference position (position where an angle of rotation is zero) by rotating the spin chuck 21 sucking and holding the substrate S (Step S201). The arithmetic processor 91 causes the head driver 6D to move and position the head unit 6G from the retracted position P1 to the imaging position P2 (Step S202). In this way, as shown in FIG. 5, the head unit 6G is so positioned that the cut 636 thereof clamps the peripheral edge part Ss and the adjacent region of the substrate S. In this way, preparation for imaging is completed.

In next Step S203, the arithmetic processor 91 turns on the light source 6E to start diffused illumination of the peripheral edge part Ss and the adjacent region of the substrate S by the head unit 6G. Following that, the arithmetic processor 91 gives a rotation command to the rotation driver 23 to start the rotation of the substrate S held on the spin chuck 21 (Step S204). Thereafter, every time the substrate S is rotated by a predetermined angle, Steps S205 to S207 are performed. That is, the image shown in FIG. 8(*a*) is obtained by the imager 6F (Step S205). This image includes the upper surface image Ma, the side surface image Mb and the lower surface image Mc, and the arithmetic processor 91 extracts the respective images Ma to Mc (Step S206). Then, the arithmetic processor 91 connects the images while applying an image processing such as rotation to each extracted image (Step S207). Such a processing is performed while the substrate S is making one turn about the axis of rotation AX, i.e. until "YES" is determined in Step S208. In this way, an entire peripheral edge image IM of the substrate S including an upper surface entire peripheral edge image IMa obtained by unfolding the upper surface Ssu of the peripheral edge part Ss of the substrate S in the circumferential direction, a side surface entire peripheral edge image IMb obtained by unfolding the side surface Sse in the circumferential direction and a lower surface entire peripheral edge image IMc obtained by unfolding the lower surface Ssd in the circumferential direction is obtained.

The arithmetic processor 91 gives a rotation stop command to the rotation driver 23 in parallel with the storage of the entire peripheral edge image IM (Step S209), thereby stopping the rotation of the substrate S held on the spin chuck 21, and turns off the light source 6E to stop illumination (Step S210). Following this, the arithmetic processor 91 causes the head driver 6D to move and position the head unit 6G from the imaging position P2 to the retracted position P1 (Step S211).

Information reflecting the eccentricity of the substrate S with respect to the axis of rotation AX is included in the upper surface entire peripheral edge image IMa or lower surface entire peripheral edge image IMc, out of the thus obtained entire peripheral edge image IM. Further, information reflecting the warp of the substrate S is included in the side surface entire peripheral edge image IMb.

Accordingly, in this embodiment, the arithmetic processor 91 calculates the eccentricity amount and the warp amount of the substrate S from the entire peripheral edge image IM (Step S3) and determines whether or not at least one of calculated values of those (=eccentricity amount and warp amount) is equal to or less than an allowable value (Step S4). Note that since conventionally frequently used methods can be used as calculation methods for the eccentricity amount and the warp amount, these calculation methods are not described here.

If it is determined that the calculated value exceeds the allowable value in Step S4 ("NO" in Step S4), the arithmetic processor 91 displays a message that the substrate S is a defective product on the input/display unit 93 (Step S5) and stops the bevel etching processing for the substrate S. On the other hand, if the eccentricity amount and the warp amount are equal to or less than the allowable value and the substrate S is confirmed as a good product, the arithmetic processor 91 performs the so-called alignment processing to correct the eccentricity amount of the substrate S (Step S6). More specifically, the arithmetic processor 91 stops the suction of the pump 24 and makes the substrate S horizontally movable on the upper surface of the spin chuck 21 after positioning the substrate S at a rotation position where an alignment correction can be performed by the eccentricity correcting mechanism 7 by rotating the spin chuck 21. Then, after performing the alignment correction by the eccentricity correcting mechanism 7, the arithmetic processor 91 resumes the suction of the pump 24 and sucks and holds the alignment-corrected substrate S on the spin chuck 21. In this way, the center of the principal surface of the substrate S is located on the axis of rotation AX to solve the eccentricity.

Subsequently, the arithmetic processor 91 causes the guard driver 33 to raise the cup 31 to the upper position. In this way, the inner peripheral surface of the cup 31 surrounds the outer periphery of the substrate S held on the spin chuck 21. If preparation for the supply of the processing liquid to the substrate S is completed in this way, the arithmetic processor 91 gives a rotation command to the rotation driver 23 to start the rotation of the spin chuck 21 holding the substrate S. Further, the arithmetic processor 91 actuates the heater 51 of the peripheral edge heating mechanism 5. Following this, the arithmetic processor 91 controls the processing liquid supplier 45 to supply the processing liquid after positioning the processing liquid nozzle 44 to the processing start position Ps. In this way, each part of the peripheral edge part Ss of the substrate S receives the supply of the processing liquid while passing through the processing start position Ps. As a result, the bevel etching processing by the processing liquid is performed for the entire peripheral edge part Ss of the substrate S (Step S7). Then, upon detecting the elapse of a processing liquid time required for the bevel etching processing of the substrate S or the like, the arithmetic processor 91 gives a supply stop command to the processing liquid supplier 45 to stop the discharge of the processing liquid. Following that, the arithmetic processor 91 gives a rotation stop command to the rotation driver 23 to stop the rotation of the spin chuck 21 and also stops heating by the heater 51.

Figure 11:
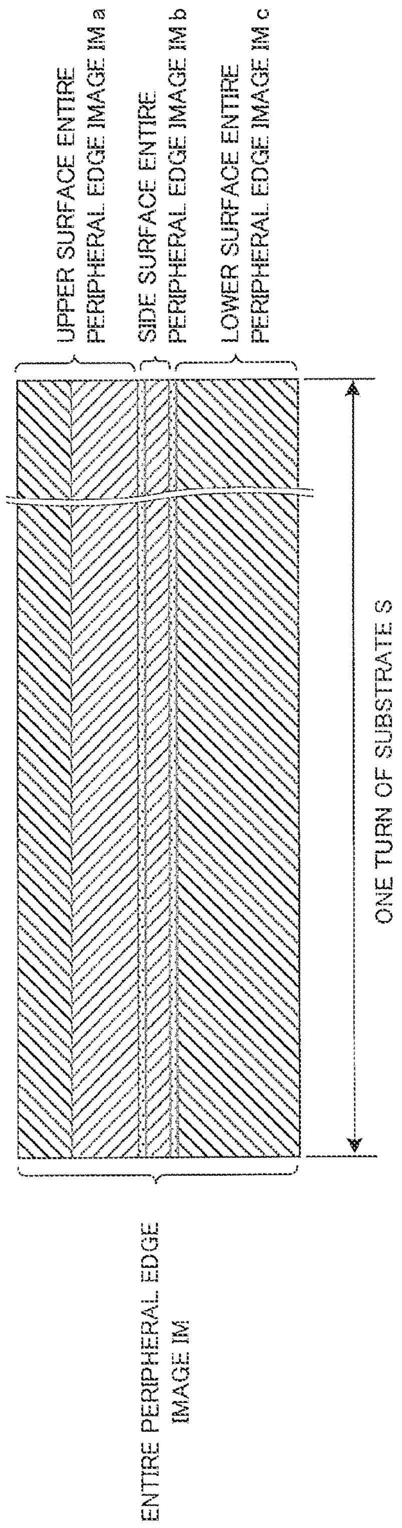
FIG. 11 is a diagram showing an example of the entire peripheral edge image after a bevel etching processing, which image is obtained according to the operation of obtaining the entire peripheral edge image shown in FIG. 10.
Figure 12:
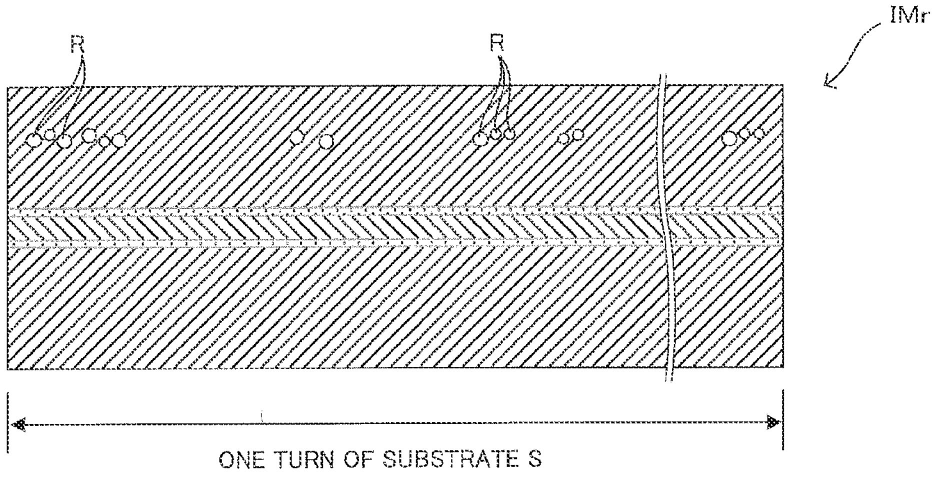
FIG. 12 is a diagram showing an example of a residue enhanced image obtaining by applying an image processing for enhancing residues as against the entire peripheral edge image.

If the bevel etching processing is completed in this way, the arithmetic processor 91 obtains the entire peripheral edge image IM after the bevel etching processing, for example, as shown in FIG. 11, by the imaging mechanism 6 as in Step S2 (Step S8). This entire peripheral edge image IM includes the upper surface entire peripheral edge image IMa, the side surface entire peripheral edge image IMb and the lower surface entire peripheral edge image IMc. Particularly, an image of the bevel-etched region is included in the upper surface entire peripheral edge image IMa. Accordingly, in this embodiment, the arithmetic processor 91 inspects the substrate S based on the upper surface entire peripheral edge image IMa of the entire peripheral edge image IM (Step S9). That is, whether or not the peripheral edge part Ss of the substrate S is bevel-etched with a desired etching width is inspected, and that inspection result is displayed on the input/display unit 93 and stored in the storage 92. Further, by applying an image processing for enhancing residues to the entire peripheral edge image IM, the arithmetic processor 91 obtains a residue enhanced image IMr, for example, as shown in FIG. 12. Then, based on the residue enhanced image IMr, the arithmetic processor 91 detects residues R remaining in the peripheral edge part Ss and the adjacent region of the substrate S, measures the number of the residues of each size, and reports the measurement result as one bevel etching result (residue analysis).

After the inspection, the arithmetic processor 91 requests the substrate conveyor robot 211 to unload the substrate S and the processed substrate S is carried out from the substrate processing apparatus 1 (Step S10). Note that a series of these steps is repeatedly performed.

As described above, according to this embodiment, the light source 6E and the imager 6F are arranged at the separated position P3 separated from each component of the apparatus for performing the bevel etching processing, whereas only the head unit 6G is arranged at the imaging position P2. The light source 6E irradiates the illumination light L1 toward the illumination region of the head unit 6G and the reflected light L2 reflected by the peripheral edge part Ss and the adjacent region of the substrate S is guided to the imager 6F, whereby the image of the peripheral edge part Ss is captured. Therefore, the peripheral edge part Ss can be satisfactorily imaged.

Further, it is possible to arrange only the head unit 6G at the imaging position P2 and arrange the light source 6E and the imager 6F other than the head unit 6G away from the respective components (=rotating mechanism 2+scattering preventing mechanism 3+processing mechanism 4+peripheral edge heating mechanism 5) of the apparatus for performing the bevel etching processing. Therefore, the imaging mechanism 6 can be incorporated in a narrow region while avoiding interference with each component of the apparatus, and excellent versatility can be obtained.

Further, the imaging position P2 is under an environment of the processing liquid for performing the bevel etching processing and under a heated environment by the heater 51. In view of this point, the head unit 6G is made of the chemical resistant and heat resistant material such as PEEK, PTFE and Si. Therefore, the image of the peripheral edge part Ss of the substrate S can be stably captured in the substrate processing apparatus 1. As a result, the eccentricity amount, the warp amount and the etching width of the substrate S can be detected with high accuracy, and excellent inspection accuracy is obtained. Further, the residue analysis can be performed with high accuracy.

Further, by using the head unit 6G, the diffused illumination of the upper surface Ssu, the side surface Sse and the lower surface Ssd of the peripheral edge part Ss of the substrate S is possible and the upper surface image, the side surface image and the lower surface image can be collectively captured. Therefore, the peripheral edge part Ss of the substrate S can be imaged with excellent efficiency from many sides.

Figure 13:
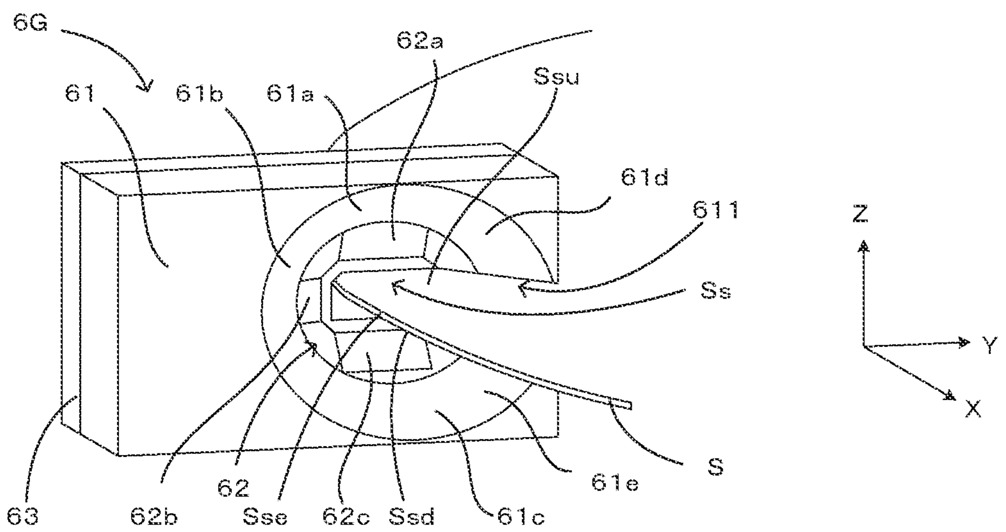
FIG. 13 is a perspective view showing a head unit equipped in a second embodiment of the imaging device according to the invention.
Figure 14:
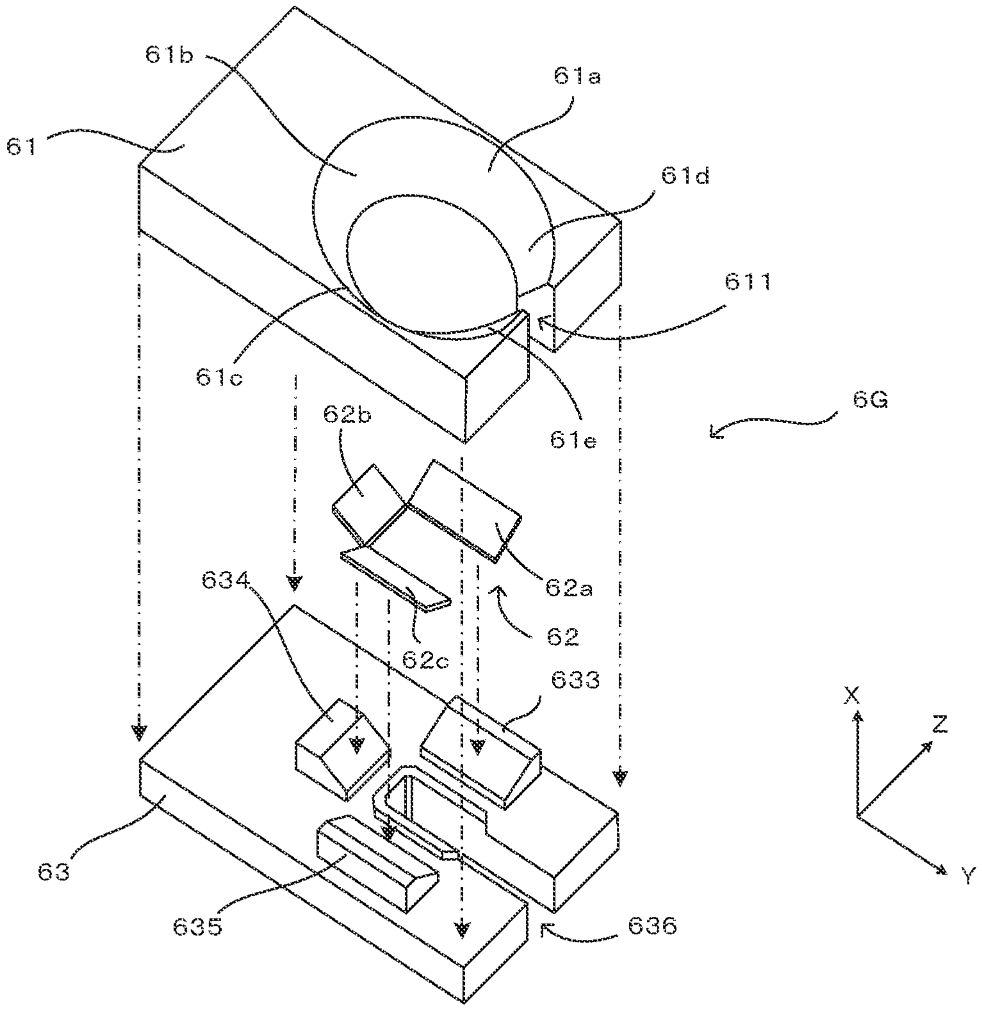
FIG. 14 is an exploded assembly perspective view of the head unit shown in FIG. 13.
Figure 15:
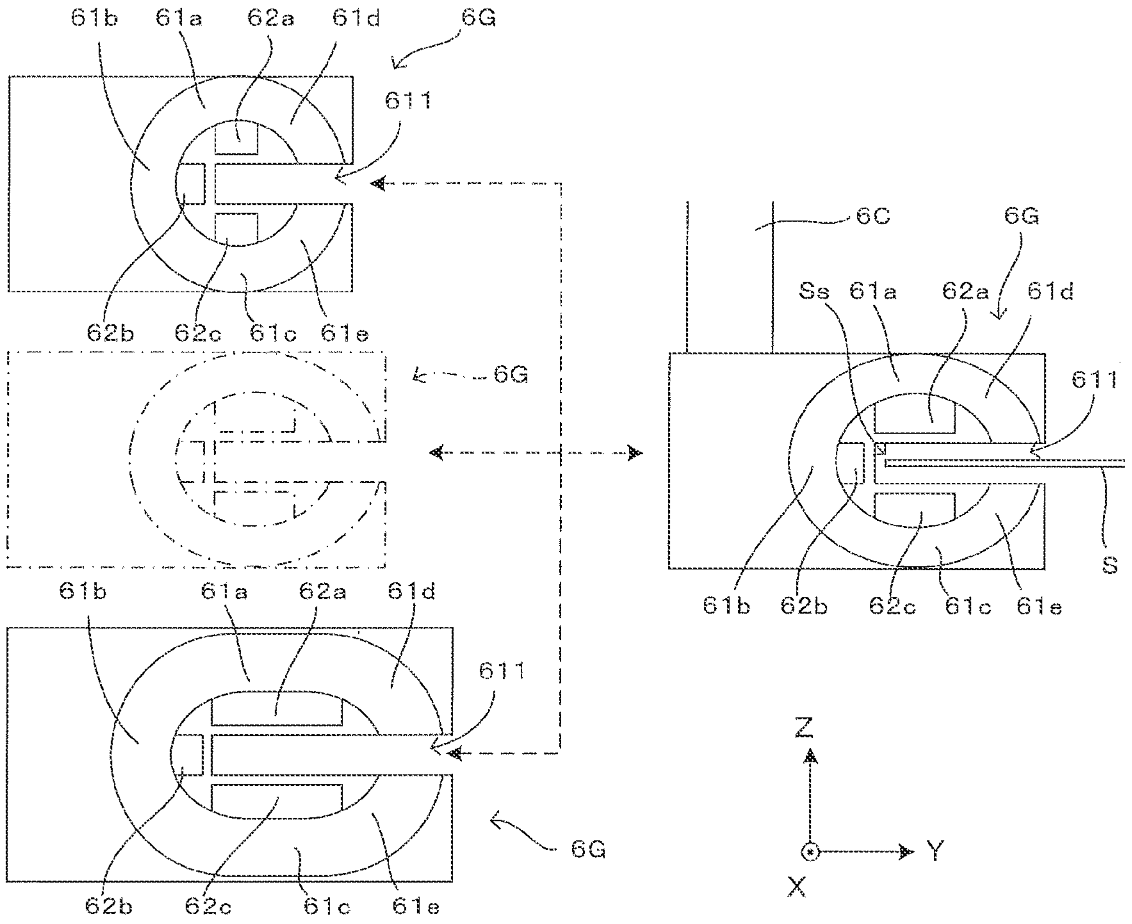
FIG. 15 is a view schematically showing an attached state of the head unit shown in FIG. 13 to an arm.

FIG. 13 is a perspective view showing a head unit equipped in a second embodiment of the imaging device according to the invention. FIG. 14 is an exploded assembly perspective view of the head unit shown in FIG. 13. FIG. 15 is a view schematically showing an attached state of the head unit shown in FIG. 13 to an arm. This second embodiment largely differs from the first embodiment in two points. The first point is that diffusing surfaces 61*d*, 61*e* equivalent to the diffusing surfaces 63*a*, 63*b* provided on the holder 63 are provided on a diffusing illuminator 61, whereas the diffusing surfaces 63*a*, 63*b* are removed from the holder 63. The second point is that the diffusing illuminator 61 and the holder 63 are fitted to each other to be integrally constituted, whereas the support 64 is omitted. Note that the other configuration is basically the same as in the first embodiment. Thus, the same components are denoted by the same reference signs and not described.

In the second embodiment, as shown in FIG. 13, a cut 611 substantially C-shaped when viewed from a (+X) direction side is formed in an end part on a (+Y) direction side. Further, in the diffusing illuminator 61, an inclined surface is provided along the cut 611. The inclined surface is a tapered surface finished to be inclined in a (−X) direction, in which illumination light L1 propagates, toward the cut 611. Particularly, out of this tapered surface, a region vertically above the cut 611, a region on a (−Y) direction side of the cut 611 and a region vertically below the cut 611 respectively function as diffusing surfaces 61*a* to 61*c*. Further, an oblique upper region and an oblique lower region in a (+Y) direction function as the diffusing surfaces 61*d*, 61*e*. That is, the diffusing surfaces 61*d*, 61*e* function similarly to the diffusing surfaces 63*a*, 63*b* in the first embodiment and the diffusing surfaces are consolidated on the diffusing illuminator 61.

According to such consolidation of the diffusing surfaces, the projecting section 632 is removed from the holder 63. Further, the holder 63 is finished into a shape fittable to the diffusing illuminator 61. That is, the diffusing illuminator 61 and the holder 63 are fitted to each other, thereby being integrated while holding mirror members 62*a* to 62*c*. In this way, a head unit 6G is composed of a smaller number of components than in the first embodiment. This head unit 6G is positioned at an imaging position P2 with an end part on the (−Y) direction side attached to an arm 6C as shown in FIG. 15. Then, before the bevel etching processing (Step S2) and after the bevel etching processing (Step S8), the diffusing illuminator 61 of the head unit 6G diffuses and reflects illumination light L1 from a light source 6E and a peripheral edge part Ss and an adjacent region of a substrate S are illuminated with diffused light La to Lc. Further, a guide unit 62 of the head unit 6G further reflects reflected light L2 reflected by the peripheral edge part Ss and the adjacent region and guides the reflected light L2 to an imager 6F. Then, the imager 6F captures images of the peripheral edge part Ss and the adjacent region.

As described above, also in the second embodiment, functions and effects similar to those of the first embodiment are achieved. Further, in the second embodiment, the head unit 6G is composed of a smaller number of components than in the first embodiment. Therefore, the manufacturing cost of an imaging mechanism 6 can be reduced.

Further, since the diffusing surfaces 61*a*, 61*d* respectively corresponding to the "first upper diffusing surface" and the "second upper diffusing surface" of the invention are present on the same tapered surface, more advantageous functions and effects than in the first embodiment are achieved. That is, in the first embodiment, the diffusing surfaces 61*a*, 63*a* respectively correspond to the "first upper diffusing surface" and the "second upper diffusing surface" of the invention and are made of mutually different materials (PTFE and PEEK) and provided on the mutually independent components (diffusing illuminator 61, holder 63). Therefore, a relatively large illuminance distribution may be produced on the upper surface Ssu of the peripheral edge part Ss of the substrate S. In contrast, since the diffusing surfaces are made of the same material (PTFE) and provided on the continuous tapered surface, an illuminance distribution can be suppressed and an upper surface entire peripheral edge image IMa can be more satisfactorily obtained. This point is similar also on the lower surface side.

In the above embodiments, the substrate S such as a semiconductor wafer corresponds to an example of an "object to be imaged" of the invention. The separated position P3 corresponds to an example of a "position distant from the object to be imaged" of the invention. The rotational direction AR1 corresponds to an example of a "given direction" of the invention. The rotating mechanism 2 corresponds to an example of a "mover" of the invention. The entire peripheral edge image acquirer functions as an "image acquirer" of the invention. The eccentricity amount deriver, the warp amount deriver, the etching width deriver and the residue analyzer function as an "inspector" of the invention. As just described, in these embodiments, a combination of the rotating mechanism 2, the imaging mechanism 6 and the arithmetic processor 91 functions as an "inspection device" of the invention.

Note that the invention is not limited to the embodiments described above and various changes other than the aforementioned ones can be made without departing from the gist of the invention. For example, although lengths of the upper diffusing surfaces 61*a*, 61*d* and 63*a*, the lower diffusing surfaces 61*c*, 61*e*, 63*b* and the mirror members 62*a*, 62*c* in the Y direction are set to correspond to the etching width of the substrate S in the embodiments, the lengths of the respective parts may be changed according to a range to be imaged by the imaging mechanism 6, for example, as shown in FIG. 15. Further, head units 6G with diffusing surfaces and mirror members having mutually different lengths in the Y direction in this way may be prepared, and the head unit 6G may be selected and used according to the range to be imaged. Further, in the case of preparing the head units 6G with the diffusing surfaces having mutually different lengths in the Y direction, the diffusing surfaces of the head units 6G may be constituted by continuously curved surfaces. Further, in the case of preparing the head units 6G with the diffusing surfaces having mutually different lengths in the Y direction, some of the diffusing surfaces of the head units 6G may be constituted by flat surfaces.

Further, although the observation lens system of the imager 6F is constituted by the object-side telecentric lens in the above embodiments, the configuration of the observation lens system of the imager 6F is not limited to this. The observation lens system of the imager 6F may be constituted by another lens.

Further, since being under the environment of the processing liquid for performing the bevel etching processing and under the heated environment by the heater 51 in the above embodiments, the diffusing illuminator 61 and the holder 63 are made of chemical resistant and heat resistant materials. Although the diffusing illuminator 61 and the holder 63 are respectively made of PTFE and PEEK, the constituent materials are not limited to these. The diffusing illuminator 61 may be made of a chemical resistant and heat resistant material other than PTFE. The holder may be made of a chemical resistant and heat resistant material other than PEEK. The diffusing illuminator 61 and the holder 63 may be made of a metal material, a resin material or a material obtained by coating the surface of a ceramic material or the like with a fluororesin material. Further, although the diffusing illuminator 61 and the holder 63 are made of mutually different materials, those may be made of the same material. Further, in the case of being used under an environment not requiring chemical resistance and heat resistance, the constituent materials of the diffusing illuminator 61 and the holder 63 are not limited. The diffusing illuminator 61 and the holder 63 may be made of a material, which is neither chemical resistant nor heat resistant.

Further, the configurations of the diffusing surfaces 61*a* to 61*c* and the diffusing surfaces 61*d*, 61*e* of the diffusing illuminator 61 and the diffusing surfaces 63*a*, 63*b* of the holder 63 are not limited. For example, if the diffusing illuminator 61 and the holder 63 are at least partially made of a metal material, the diffusing surfaces 61*a* to 61*c*, the diffusing surfaces 61*d*, 61*e* or the diffusing surfaces 63*a*, 63*b* may be obtained by applying shot blasting to the surface of the metal material.

Further, the material of the mirror members 62*a* to 62*c* is also not limited to Si (silicon). That is, another material may be used if this material is chemical resistant against the processing liquid and heat resistant against the processing temperature. The mirror members 62*a* to 62*c* may be, for example, made of a material obtained by depositing a metal material on the surface of a chemical resistant and heat resistant material. Further, in the case of being used under an environment not requiring chemical resistance and heat resistance, the constituent material of the mirror members 62*a* to 62*c* is not limited. The mirror members 62*a* to 62*c* may be made of a material, which is neither chemical resistant nor heat resistant. The mirror members 62*a* to 62*c* may be, for example, made of a material obtained by depositing a metal material on the surface of a material, which is neither chemical resistant nor heat resistant.

Further, although the entire peripheral edge image IM (FIG. 11) is constantly obtained in the above embodiments, an image to be obtained may be selected according to an inspection content. For example, in the case of inspecting the eccentricity of the substrate S, only the upper surface entire peripheral edge image IMa may be obtained. Further, in the case of inspecting the warp of the substrate S, only the side surface entire peripheral edge image IMb may be obtained. Further, although the peripheral edge image for one turn of the substrate S is obtained, there is no limitation to the entire peripheral edge. For example, a peripheral edge image of less than one turn or a plurality of turns may be obtained according to the inspection content.

Further, although the peripheral edge part is imaged by moving the substrate S as an object to be imaged while fixedly arranging the imaging mechanism 6 in the above embodiments, the imaging mechanism 6 may be moved while the substrate S is fixed. Further, both the substrate S and the imaging mechanism 6 may be moved. That is, the peripheral edge part of the object to be imaged may be imaged by the imaging device while the object to be imaged (substrate S) is relatively moved with respect to the imaging device (imaging mechanism 6).

Further, although the imaging mechanism 6 equivalent to the imaging device according to the invention is incorporated into the substrate processing apparatus 1 for bevel-etching the peripheral edge part Ss of the substrate S in the above embodiments, an application object of the imaging device (imaging mechanism 6) is not limited to this. The invention is applicable also to an imaging device for imaging a peripheral edge part of an object to be imaged, an inspection technique for inspecting an object to be imaged based on a peripheral edge part image captured by this imaging device and the like. Further, the imaging mechanism 6 equivalent to the imaging device according to the invention and the inspection device are, for example, applicable also to a substrate processing apparatus for removing a coating film on the peripheral edge part of the substrate S by supplying a removing liquid for the coating film to the peripheral edge part of the substrate S formed with the coating film.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

This invention can be applied to imaging devices in general for imaging a peripheral edge part of an object to be imaged such as a semiconductor wafer, inspection techniques in general for inspecting an object to be imaged based on a peripheral edge part image captured by the imaging device and substrate processing apparatuses in general equipped with the imaging device.

What is claimed is:

1. A substrate processing apparatus, the apparatus comprising:

a spin chuck configured to hold and rotate a substrate;

a substrate conveyor robot that places the substrate on an upper surface of the spin chuck by inserting a hand of the substrate conveyor robot into a conveyance space above the spin chuck;

a processing liquid nozzle configured to process a peripheral edge part of the substrate by supplying a processing liquid to the peripheral edge part of the substrate rotated by the spin chuck; and an imaging device configured to image the peripheral edge part before or after the peripheral edge part is processed, wherein the imaging device includes:

a light source configured to irradiate illumination light toward an imaging position for imaging the peripheral edge part of the substrate from a separated position from the peripheral edge part of the substrate;

a head unit including a diffusing illuminator and a mirror, the diffusing illuminator including a diffusing surface configured to diffuse and reflect the illumination light from the light source toward the peripheral edge part and being configured to illuminate the peripheral edge part with diffused light from the diffusing surface at the imaging position, the mirror being configured to guide reflected light reflected by the peripheral edge part illuminated with the diffused light to the position distant from the substrate;

a camera configured to obtain an image of the peripheral edge part by receiving the reflected light guided by the mirror at the separated position distant from the peripheral edge part of the substrate;

a head driver configured to move the head unit between the imaging position and a retracted position and to position the head unit to the imaging position or the retracted position, the retracted position being a position retracted from the substrate; and a positioning controller configured to control the head driver to position the head unit at the retracted position while the peripheral edge part of the substrate is not being imaged, and to position the head unit at the imaging position while the peripheral edge part of the substrate is being imaged, and wherein the conveyance space into which the hand of the conveyor robot is inserted is formed above the spin chuck by retracting the head unit to the retracted position, wherein the apparatus further comprises a cup disposed so as to surround the substrate held by the spin chuck, wherein the imaging position is located inside the cup, whereas the retracted position is located outside the cup, and wherein the light source and the camera are disposed outside the cup.

2. The substrate processing apparatus according to claim 1, wherein:

the diffusing illuminator is configured to generate light propagating toward a side surface or a lower surface of the peripheral edge part as the diffused light by diffusing and reflecting the illumination light.

3. The substrate processing apparatus according to claim 1, wherein:

the imaging position where the head unit is located is at a side of the peripheral edge part of the substrate.

4. The substrate processing apparatus according to claim 1, wherein:

the head unit includes a holder configured to hold the mirror;

the holder has a cut that enters the peripheral edge part and a region further radially inward of the peripheral edge part when the head unit is placed in the imaging position; and the mirror is provided at least one of above, to a side and below the cut.

* * * * *